United States Patent [19]

Ouellette

[11] Patent Number: 4,962,843
[45] Date of Patent: Oct. 16, 1990

[54] COMBINER RAILS

[75] Inventor: Joseph F. Ouellette, Glendale, Mo.

[73] Assignee: Ouellette Machinery Systems, Inc., Fenton, Mo.

[21] Appl. No.: 309,239

[22] Filed: Feb. 13, 1989

[51] Int. Cl.⁵ .............................................. B65G 47/12
[52] U.S. Cl. .................................. 198/453; 198/454; 193/35 R
[58] Field of Search ............. 193/35 R; 198/453, 454, 198/455, 448

[56] References Cited

U.S. PATENT DOCUMENTS

| | | | |
|---|---|---|---|
| 3,628,647 | 12/1971 | Beard | 198/454 |
| 3,862,680 | 1/1975 | Johnson | 198/454 |
| 3,934,706 | 1/1976 | Tice | 198/454 |
| 4,681,203 | 7/1987 | Kornylak | 193/35 R |

FOREIGN PATENT DOCUMENTS

| | | | |
|---|---|---|---|
| 2851837 | 6/1979 | Fed. Rep. of Germany | 198/453 |
| 0151263 | 11/1979 | Japan | 198/448 |
| 0102316 | 6/1985 | Japan | 198/448 |

Primary Examiner—Joseph E. Valenza
Assistant Examiner—James R. Bidwell
Attorney, Agent, or Firm—Rogers, Howell & Haferkamp

[57] ABSTRACT

A combiner rail having a plurality of horizontal rows of rollers. Each horizontal row is staggered from the adjacent horizontal row to prevent containers from jamming in gaps between adjacent rollers.

9 Claims, 2 Drawing Sheets

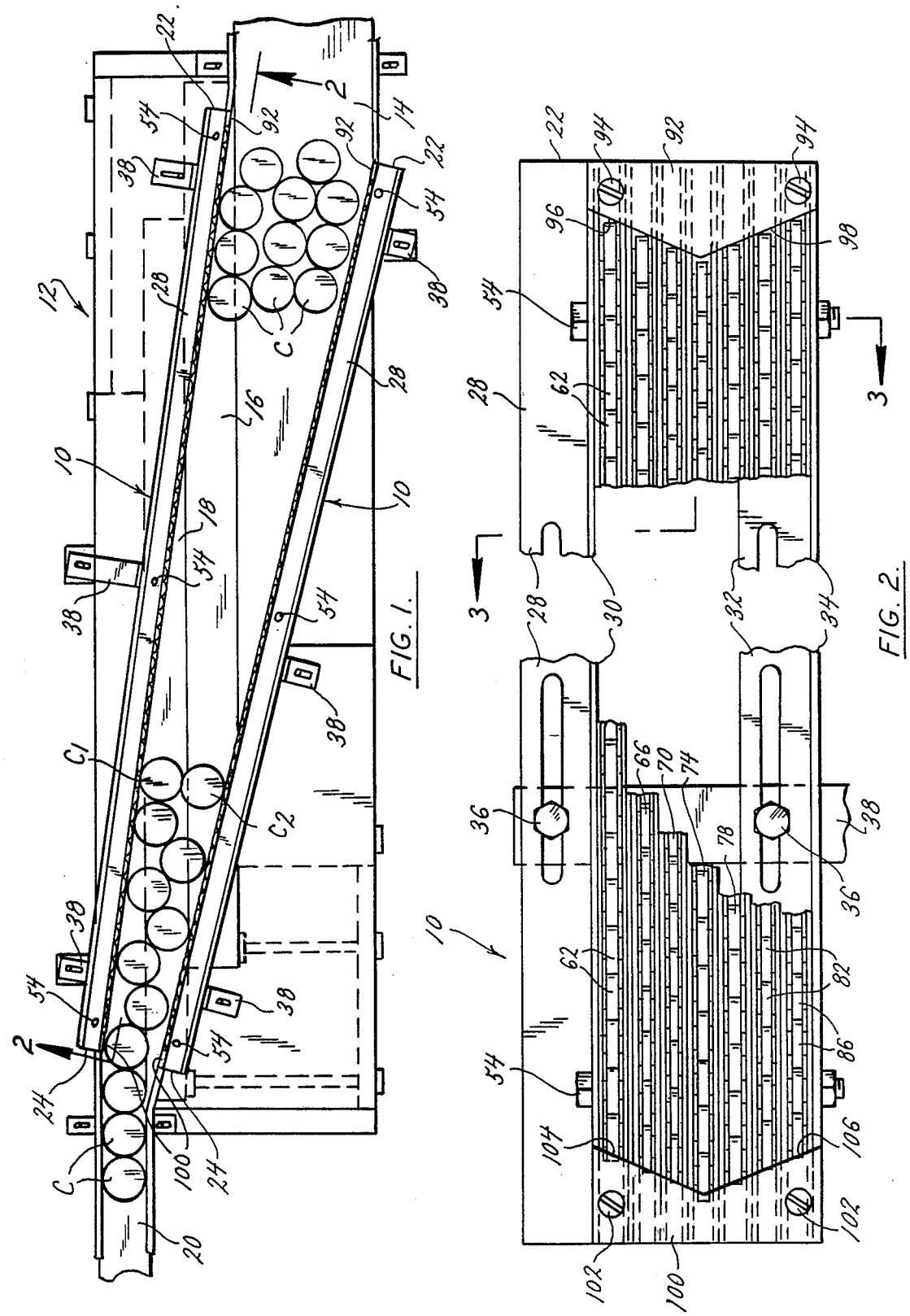

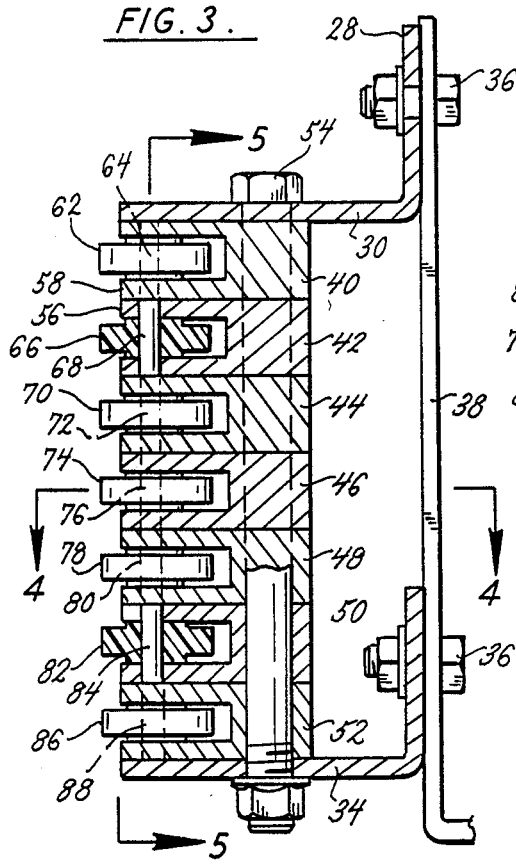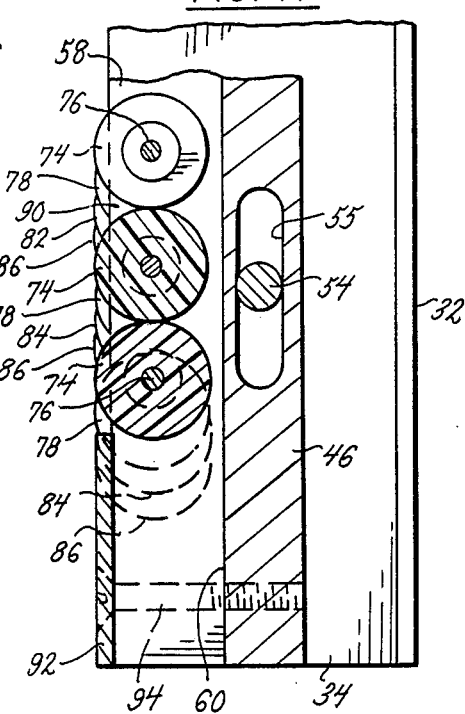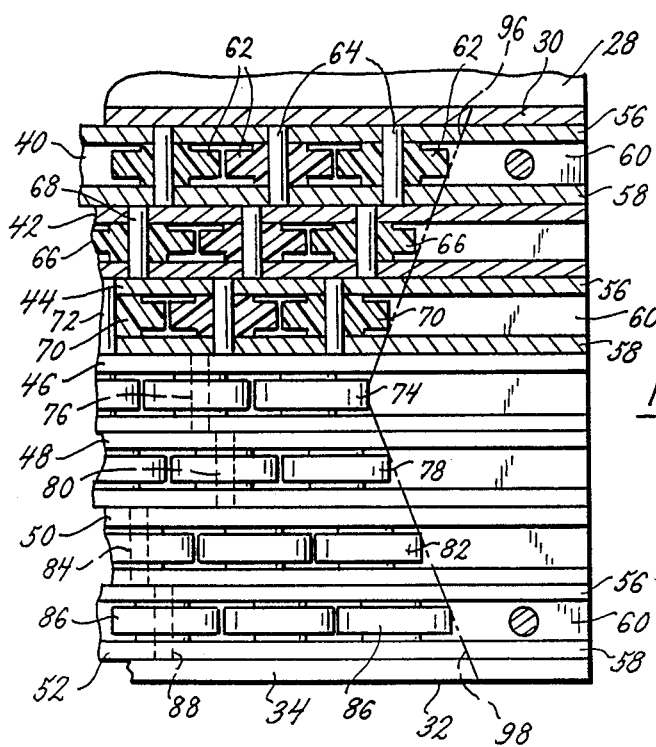

COMBINER RAILS

BACKGROUND OF THE INVENTION

This invention relates to combiner rails for installation on opposite sides of a container-transporting conveyor system. The function of the combiner rails is to reduce a relatively wide span of multiple containers to a single row or file of the containers. More particularly, the invention relates to combiner rails each having rollers in a staggered pattern that virtually eliminates nesting between adjacent rollers. As a result, jamming of containers between the combiner rails and excessive roller impact wear are avoided.

In industrial installations, there are many places where combiner rails are used. For example, combiner rails may be installed in a bottling plant at each location where a wide accumulation of bottles must be reduced to a single file. There can be a number of such locations in a single bottling plant conveyor system. As containers are conveyed between the combiner rails, jamming of containers can occur when a plurality of the containers, usually two, arrive at the same restricted area simultaneously and are squeezed and jammed between converging combiner rails.

In an effort to solve the jamming problem, combiner rails that incorporate a series of rollers have been developed. In this roller combiner rail construction, a plurality of longitudinally spaced shafts are provided on vertical axes in a common plane. One or more rollers of equal diameter are mounted in a vertical tier on each shaft. To reduce the depth of gaps between the rollers on adjacent shafts, the rollers on one shaft are spaced from one another and are staggered from the rollers on an adjacent shaft, allowing the two tiers of rollers to overlap. Even with this overlapping roller arrangement, the radial projections of the rollers limit how close the shafts can be to one another. Therefore, even though the gaps between rollers are reduced by this overlapping roller arrangement, these gaps are still wide and deep enough to receive segments of containers.

As a container moves along the combining rail, it can be guided into one of these gaps and to escape the gap, the container cannot be blocked from moving away from the gap. When two containers simultaneously enter gaps on opposing combiner rails they become wedged together and jammed. The pressure of the large number of conveyors behind the jammed containers prevents the jammed containers from escaping the recesses to relieve the jam. When such jamming occurs, the jammed containers must be broken free manually often requiring shut down of the conveyor system. In any event, the jamming interrupts the plant production.

In addition to the jamming problem, the rollers in conventional combining rails are subject to wear from impact with containers. These impact blows occur as a container lurches from one gap to the next one. Each time a container enters a gap, it collides with the surface of the roller immediately downstream of the gap. Repetition of these impacts produces wear on the rollers and decreases the useful life of the combiner rail.

SUMMARY OF THE INVENTION

The environment for this invention is a conveyor system for containers such as a conveyor system that transports bottles through a bottling plant. These new combiner rails are adapted for installation on opposite sides of the conveyor system in an orientation that reduces the effective width of the conveyor system from widely spaced upstream ends of the combiner rails to narrowly spaced downstream ends. Each combiner rail has a plurality of sets of rollers. Each roller set is supported by a channel in a horizontal row and several channels are stacked one above the other. The axes of the rollers in one horizontal channel are staggered from the axis of the rollers in the immediately adjacent horizontal channel. This arrangement is accomplished by providing channels which may be extruded for supporting each horizontal row of shafts and longitudinally offsetting the channels as desired. Because of these offset roller axes, the gaps between adjacent rollers in any given horizontal row are staggered from the gaps in an adjacent horizontal row. The overall effect is to practically eliminate the gap or recess between rollers that has prevailed in the prior art.

BRIEF DESCRIPTION OF THE DRAWINGS

FIG. 1 is a top plan view of a typical conveyor installation incorporating the combiner rails of this invention.

FIG. 2 is an enlarged partially broken view in section taken along the plane of the line 2—2 of FIG. 1.

FIG. 3 is a further enlarged view in section taken along the plane of the line 3—3 of FIG. 2.

FIG. 4 is a view in section taken along the plane of the line 4—4 of FIG. 3.

FIG. 5 is a view in section taken along the plane of the line 5—5 of FIG. 3.

DETAILED DESCRIPTION OF THE INVENTION

FIG. 1 illustrates two of the combiner rails 10 of this invention installed on opposite sides of a conveyor system 12. Preferably the conveyor system incorporates a series of conveyors 14, 16, 18 and 20 that move at progressively greater rates of speed as they move toward the left as viewed in FIG. 1, the conveyor 14 being the slowest and the conveyor 20 being the fastest. This conveyor system with plural conveyors helps avoid jamming and is conventional in the art.

As FIG. 1 shows, the combiner rails 10 are installed with their upstream ends 22 on opposite sides of the relatively wide conveyor 14 while their downstream ends 24 are positioned on opposite sides of the relatively narrow conveyor 20. Several containers C can fit side-by-side between the upstream ends 22 of the combiner rails but by the time the containers C reach the downstream ends 24, only a single conveyor can fit between the combiner rails 10 as the containers C exit onto the conveyor 20. This orientation of combiner rails likewise is known in the art and is conventional. However, the structure and manner of operation of the combiner rails 10 are new.

As shown in FIG. 2, each combiner rail 10 includes an upper angle member 28 having a horizontal flange 30 and a lower angle member 32 having a horizontal flange 34. The angle members 28 and 32 are connected by bolts 36 to mounting brackets 38 by which the combiner rail 10 is connected to the conveyor system 12.

A vertical stack of extruded channels 40, 42, 44, 46, 48, 50 and 52 are mounted on elongated bolts 54 by which they are fastened between the upper and lower flanges 30 and 34. Each extruded channel member 40–52 has an elongated slot 55 through which the bolt 54 extends to enable longitudinal adjustment of the position of each channel member 40–52 relative to the bolts 54 and to each other.

Each channel member 40–52 has horizontally disposed upper and lower flanges 56 and 58 with a space 60 between them. A series of rollers 62 are supported by the channel member 40, each journaled on a vertical shaft or pin 64 that is supported by and extends between the upper and lower flanges 56 and 58. Similarly, a series of rollers 66 are journaled on pins 68 supported by the channel member 42, a series of rollers 70 are journaled on pins 72 supported by the channel member 44, a series of rollers 74 are journaled on pins 76 supported the channel member 46, a series of rollers 78 are journaled on pins 80 supported by the channel member 48, a series of rollers 82 are journaled on pins 84 supported by the channel member 50, and a series of rollers 86 are journaled on pins 88 supported by the channel member 52. The diameters of all the rollers 62, 66, 70, 74, 78, 82 and 86 are the same. Likewise, the span between the axes of each pair of shafts 64 is the same as that between the shafts 68, the shafts 72, the shafts 76, the shafts 80, the shafts 84, and the shafts 88. This span between axes is set to place the rollers in each channel, such as the rollers 74 supported by the channel 46, as close together as possible without contacting one another, such as the rollers 74 illustrated in FIG. 4. Nevertheless, as FIG. 4 illustrates, the gap 90 between adjacent rollers 74 in a given row or channel 46 remains relatively wide and deep. For example, if each roller is about 0.730 inch in diameter and nearly contacts the adjacent rollers, each gap 90 is about 0.730 inch wide and is about 0.365 inch deep. Gaps such as the gaps 90 would be large enough to cause jamming of containers C such as when two such containers simultaneously reach positions transversely aligned between the combiner rails 10, such as the positions illustrated for the containers $C_1$ and $C_2$ in FIG. 1, with both containers $C_1$ and $C_2$ projecting into gaps 90 on the opposing combiner rails 10. Such jamming is avoided by the present invention.

Construction of the roller support frame in the form of individual channel members 40–52 allows each to be independently positioned. In particular, because of the elongated slots 55 (FIG. 4) the longitudinal positions of the respective channel members 40–52 can be accurately selected. In accordance with the present invention, these longitudinal positions of the channel members are selected to offset or stagger the rollers of one channel member from the rollers of an adjacent channel member, accomplished by offsetting the roller shafts supported by one channel member from the shafts supported by the adjacent channel member. As is best illustrated in FIG. 5, the shafts 68 supported by the channel member 42 are offset by about 3/16 inch to the left of the axes of the shafts 64 that are supported by the channel member 40. The axes of the shafts 72 supported by the channel member 44 are offset by about the same 3/16 inch from the shafts 68 or about ⅜ inch from the shafts 64. The shafts 76 supported by the channel member 46 are offset by about 3/16 inch from the shafts 72 and therefore about ⅜ inch from the shafts 68 and about 9/16 inch from the shafts 64. The lower channel members 48, 50 and 52 are located to stagger their shafts in the opposite direction. As shown in FIG. 5, the channel member 48 is located so that its shafts 80 are staggered to the right by about 3/16 inch relative to the shafts 76. The shafts 84 are further staggered to the right by about 3/16 inch relative to the shafts 80 and about ⅜ inch relative to the shafts 76. The shafts 88 are staggered to the right about 3/16 inch relative to the shafts 84 which locates them about ⅜ inch to the right of the shafts 80 and about 9/16 inch to the right of the shafts 76.

The important result of all these staggered shafts is to fill the gaps 90 with other rollers. As shown in FIG. 4, viewed from above each gap 90 between adjacent rollers 74 in a given row is spanned by three other staggered rollers, such as the rollers 78, 82 and 86, with resulting gaps that are so shallow that they have practically no effect as deterrents to movement of the containers C even when they reach the positions of the containers $C_1$ and $C_2$ in FIG. 1.

To square off the ends 22 and 24, there is a lead end plate 92 fastened by suitable bolts 94 to two of the channel members 40 and 52. The end plate 92 has edges 96 and 98 that conform to the staggered configuration of the rollers 62, 66, 70, 74, 78, 82 and 86, as shown in FIG. 2. An end plate 100 is fastened by bolts 102 to the channel members 40 and 52 adjacent the trailing end 24 of each combiner rail 10. The end plate 100 has edges 104 and 106 that compliment the staggered shape of the rollers 62, 66, 70, 74, 78, 82 and 86 at the trailing end of the combiner rail 10. As indicated in FIG. 4, both plates 92 and 100 are generally in the plane defined by the common tangents of the rollers facing the containers C. Therefore, the end plates 92 and 100 eliminate gaps upstream and downstream of the rollers.

OPERATION

The combiner rails 10 of this invention are installed on a conveyor assembly 12 in locations and orientation that are as in the prior art. As shown in FIG. 1, the width between the combiner rails near their leading ends 22 provides space for several containers C abreast of one another. This width gradually narrows as the combiner rails 10 converge toward their trailing ends 24. As is conventional, the conveyors move at progressively increasing speeds from right to left as viewed in FIG. 1. The conveyor 16 moves faster than the conveyor 14, the conveyor 18 moves faster than the conveyor 16, and the conveyor 20 moves faster than the conveyor 18.

As the containers C are conveyed to the left as viewed in FIG. 1, they are guided by the end plates into initial contact with the rollers 62 and 86. Since the rollers are staggered, any tendency of the containers to enter the gaps 90 between adjacent rollers 62 and 86 is blocked because the containers promptly contact the rollers 66 and 82. This is followed by contact with the rollers 70 and 78, and thereafter with the roller 74. Contact with the roller 74 is followed by contact with the next ones of the rollers 62 and 86 and the contact sequence repeats as the containers C are conveyed downstream. Thus, the staggered arrangement of the rollers prevents any container C from entering a gap such as the gap 90 between adjacent rollers, and jamming of the containers is essentially eliminated.

In spite of the relative complexity of providing staggered rollers, the cost of producing this combiner rail 10 is reduced by the efficiency of the design. Staggering of the rollers is accomplished by simply aligning the individual channel members 40–52. The channel members are of the same cross-section and therefore all of them may be formed by extrusion using the same extrusion die. All of the rollers are identical, preferably of Delrin plastic, and may be produced by the same mold. All of the pins or shafts 64, 68, 72, 76, 80, 84 and 88 are likewise identical. Thus, because of its design, combiner rails 10 can be produced inexpensively and therefore can be sold at competitive prices.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed:

1. In a conveyor system for conveying containers, a combiner rail for installation as one side wall of the conveyor system in an area where an accumulation of containers in a relatively wide span is to be reduced to a single file of the containers in a narrow span, the combiner rail comprising:
    means for supporting and securing a plurality of rollers in each of a plurality of horizontal rows with each roller rotatable on a vertical axis independent of the axes of the remaining rollers,
    means for mounting each horizontal row of rollers,
    and means for simultaneously staggering the axes of the rollers in one horizontal row relative to the axes of the rollers in at least two other horizontal rows by adjusting at least one mounting means relative to at least two other mounting means.

2. The combiner rail of claim 1 wherein the rollers are substantially identical and are of molded hard plastic.

3. The combiner rail of claim 1 where in the supporting means comprises a plurality of horizontal channel members, one for each horizontal row of rollers, each channel member being independent of the remaining channel members.

4. The combiner rail of claim 1 wherein there are at least three horizontal rows of rollers with the axes of each row staggered from the axes of at least two of the other rows.

5. The combiner rail of claim 1 wherein there are at least four horizontal rows of rollers with the axes of each row staggered from the axes of at least three of the other rows.

6. The combiner rail of claim 1, 4, or 5 wherein the diameter of each roller is between about one half inch and one inch and the horizontal distance between the axes of one horizontal row from the axes of an adjacent horizontal row is between about one eighth inch and one fourth inch.

7. In the conveyor system of claim 1 a second combiner rail like the aforesaid combiner rail but for installation as another side wall opposite said one side wall.

8. In a conveyor system for conveying containers, a combiner rail for installation as one side wall of the conveyor system in an area where an accumulation of containers in a relatively wide span is to be reduced to a single file of the containers in a narrow span, the combiner rail comprising:
    means for supporting a plurality of rollers in a plurality of horizontal rows with each roller rotatable on a vertical axis, each mounted for free rotation on a shaft, the supporting means comprising a plurality of horizontal channel members, one for each horizontal row of rollers,
    and means for staggering the axes of the rollers in one horizontal row relative to the axes of the rollers in another horizontal row;
    the staggering means comprising means for adjusting the horizontal positions of the channel members relative to one another.

9. A combiner rail for installation as a side wall of a container carrying conveyor system at a location where the volume of containers is to be reduced from several wide to single file comprising;
    a frame,
    a first plurality of pins supported by the frame in a substantially horizontal first row,
    a second plurality of pins supported by the frame in a substantially horizontal second row below the first row, the axes of the pins in the second row being offset from the axes of the pins in the first row in a direction lengthwise of the frame parallel to the path of movement of the containers,
    a third plurality of pins in a substantially horizontal third row below the second row, the axes of the pins in the third row being staggered from the axes of the pins in the second row,
    a plurality of rollers each mounted on one of the pins, and including a lead end plate supported by the frame upstream of the rollers and a trailing end plate supported by the frame downstream of the rollers, the plates having substantially vertical edges opposite the rollers and having edges proximate to the rollers and having faces generally in a plane common to the tangents of all the rollers.

* * * * *